United States Patent [19]
Nishikawa et al.

[11] 4,096,096
[45] Jun. 20, 1978

[54] METHOD FOR MANUFACTURE OF CATALYST USED FOR REDUCTION OF NITROGEN OXIDES

[75] Inventors: Yasuo Nishikawa; Akira Watanabe; Tetsuya Sugimoto; Yasutoshi Mizuta, all of Okayama; Yoshio Hatayama, Kashihara, all of Japan

[73] Assignee: Kyushu Refractories Co., Ltd., Bizen, Japan

[21] Appl. No.: 712,698

[22] Filed: Aug. 9, 1976

[30] Foreign Application Priority Data

Aug. 21, 1975 Japan ............................... 50-101447

[51] Int. Cl.² .................... B01J 21/04; B01J 23/74
[52] U.S. Cl. .......................... 252/466 J; 423/213.5; 423/239

[58] Field of Search ................. 252/466 J; 423/213.5, 423/239; 427/215

[56] References Cited

U.S. PATENT DOCUMENTS

| | | | |
|---|---|---|---|
| 2,449,295 | 9/1948 | Gutzeit | 252/466 J |
| 3,896,049 | 7/1975 | Dworak | 252/466 J |
| 3,976,745 | 8/1976 | Nakajima et al. | 423/239 |
| 3,987,146 | 10/1976 | Clay et al. | 423/239 |

Primary Examiner—W. J. Shine
Attorney, Agent, or Firm—Lane, Aitken, Dunner & Ziems

[57] ABSTRACT

An excellent catalyst for the reduction of nitrogen oxides is obtained by mixing a specific aluminum-containing substance with a specific iron-containing substance in water and baking the resultant precipitate.

3 Claims, 1 Drawing Figure

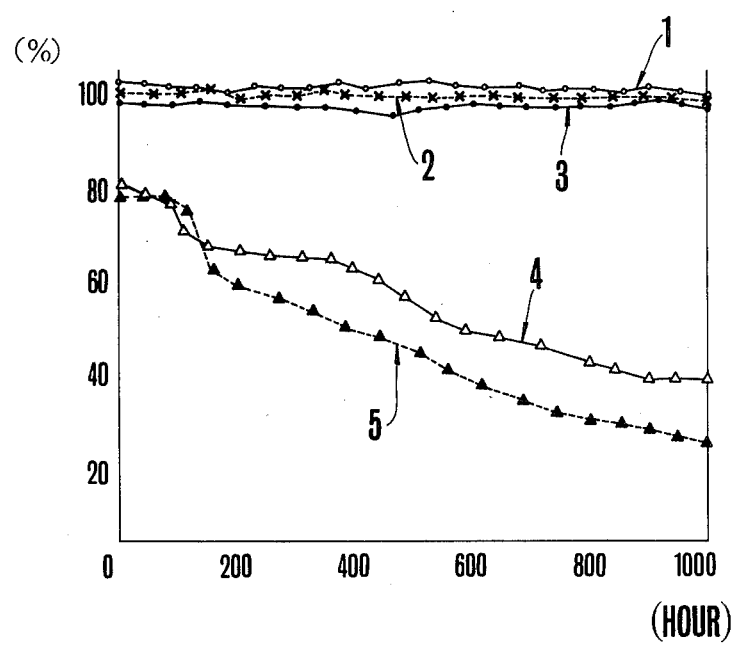

METHOD FOR MANUFACTURE OF CATALYST USED FOR REDUCTION OF NITROGEN OXIDES

FIELD OF THE INVENTION

This invention relates to a method for the production of a catalyst for use in the reduction of nitrogen oxides. More particularly, this invention relates to a method for the production of a catalyst for use in the removal, by reduction, of nitrogen oxides (hereinafter referred to as $NO_x$) from a gas containing $NO_x$.

BACKGROUND OF THE INVENTION

Generally, exhaust gases discharged from various combustion devices contain $NO_x$ in conjunction with sulfur oxides (hereinafter referred to as $SO_x$) and carbon monoxide. The $NO_x$ is the principal cause for the so-called photochemical smog which has been posing a serious social problem in the recent years. For prevention of the air pollution, it is necessary either to decrease the $NO_x$ content in exhaust gases or to remove $NO_x$ from exhaust gases.

With a view to decreasing the $NO_x$ content in exhaust gases, measures have been taken to improve the burners of combustion devices and to adjustment of combustion conditions. Usually, these measures result in a degradation in the combustion efficiency and a decline in the combustion temperature. Thus, the measures cannot be called a general solution applicable to all the combustion devices. There has been proposed a method which, for the purpose of removing $NO_x$ from an exhaust gas, effects catalytic reduction of $NO_x$ in the exhaust gas with ammonia, in the presence of a catalyst formed by depositing a noble metal such as platinum on γ-alumina (activated alumina) or in the presence of a catalyst of an oxide of metal such as copper or chromium supported on an activated alumina. When, in this method, the reduction is carried out by using the catalyst containing the deposited noble metal and when the exhaust gas happens to contain $SO_x$, then the noble metal is poisoned by the $SO_x$ and consequently prevented from manifesting the catalytic activity effectively, with a disadvantageous result that the catalyst will fail to endure prolonged use. In addition, this catalyst has another economical disadvantage in that it is rather expensive. When, in this method, the reduction is performed by using the catalyst having the oxide of metal deposited on activated alumina, there is also involved a disadvantage that the catalytic activity of the catalyst, the optimum reaction temperature and other similar factors are notably affected by the composition of the exhaust gas; the composition in the sense of presence or absence of $SO_x$, for example. Accordingly, where the $NO_x$ in the exhaust gas is to be removed by the catalytic reduction thereof with ammonia, the above-mentioned known catalysts are not expected to serve their purposes satisfactorily.

SUMMARY OF THE INVENTION

An object of the present invention, therefore, is to provide a method for the production of a catalyst which, in the removal of $NO_x$ from an exhaust gas by catalytic reduction of the $NO_x$ with ammonia, can be used quite effectively over a long period of time without being affected by the composition of the exhaust gas, namely without reference to the presence or absence of $SO_x$ in the exhaust gas and to the concentration of $NO_x$ being removed.

This and other objects of the present invention will become apparent from the following description of the invention.

We made a study with a view to accomplishing the object described above. We have consequently acquired a knowledge that the $NO_x$ contained in a gas is reduced quite effectively into the form of nitrogen when this gas is subjected to catalytic reaction with ammonia by using, as the catalyst, a baked substance composed predominantly of iron oxide and alumina and obtained by mixing a specific aluminum-containing substance and a specific iron-containing substance in water for precipitation and subsequently baking the resultant precipitate. We have acquired the additional knowledge that when the gas containing $NO_x$ is mixed with a varying proportion of $SO_x$ and the resultant mixed gas is subjected to the aforementioned reaction using as the catalyst the aforementioned baked substance, the $NO_x$ in the gas can be reduced very effectively without the baked substance being affected by the composition of the gas and without sacrificing the percentage of denitrification. The present invention has been accomplished on the basis of these discoveries.

According to the present invention, therefore, there is provided a method for the production of a catalyst for the reduction of nitrogen oxides, which method includes mixing in water at least one aluminum-containing substance selected from the group consisting of alumina sol, alumina gel and water-soluble aluminum salts and at least one iron-containing substance selected from the group consisting of $Fe_2O_3$, $Fe_2O_3 \cdot nH_2O$, $Fe(OH)_2$, $Fe(OH)_3$, $Fe_3O_4 \cdot nH_2O$ and water-soluble iron salts, treating the resultant mixture in water so as to cause precipitation and baking the resultant precipitate.

BRIEF DESCRIPTION OF THE DRAWING

The accompanying drawing is a graph showing the results of continuous denitrification treatment performed on an exhaust gas containing a large amount of $SO_x$, by use of the catalyst according to the present invention and the catalyst according to the conventional technique, respectively.

DETAILED DESCRIPTION OF THE INVENTION

In the present invention, the first step to be taken is to mix an aluminum-containing substance and an iron-containing substance in water. The aluminum-containing substance used is at least one member selected from the group consisting of alumina sol, alumina gel and water-soluble aluminum salts. Examples of the water-soluble aluminum salt include aluminum nitrate, aluminum sulfate, aluminum formate and aluminates having alkali metal moieties. The iron-containing substance to be mixed with the aluminum-containing substance is at least one member selected from the group consisting of $Fe_2O_3$, $Fe_2O_3 \cdot nH_2O$, $Fe(OH)_2$, $Fe(OH)_3$, $Fe_3O_4 \cdot nH_2O$ and water-soluble iron salts. Examples of the water-soluble iron salts include ferrous sulfate, ferric sulfate, ferrous nitrate and ferric nitrate. The proportion in which the aluminum-containing substance and the iron-containing substance are mixed is not particularly limited. It is, however, preferable that the aluminum-containing substance fall in the range of 5 to 45 percent, more preferably 10 to 35 percent, by weight computed as $Al_2O_3$ and the iron-containing substance fall in the range of 55 to 95 percent, more preferably 65 to 90 percent, by weight as $Fe_2O_3$.

As the next step, the mixture in water, which is obtained by mixing the aluminum-containing substance and the iron-containing substance as described above, is caused to precipitate. The precipitation can be generally obtained by merely allowing the mixture in water to stand at rest. Where a water-soluble aluminum salt is used as the aluminum-containing substance and/or a water-soluble iron salt is used as the iron-containing substance, since these substances are soluble in water, they fail to produce a precipitate if just left to stand. The precipitation can be obtained in this case by adding to the aqueous solution containing the mixture a neutralizing agent such as ammonium hydroxide, sodium hydroxide or carbon dioxide.

After the precipitate has issued from the mixture, the solid and the liquid are separated. The precipitate thus removed is, as occasion demands, washed, then dried and molded, and finally baked. The baking of the precipitate is carried out at temperatures in the range of 300° to 1000° C, preferably 300° to 800° C for not less than 30 minutes. The baked substance thus obtained is composed predominantly of iron oxide and alumina, with the iron oxide content ranging from 55 to 95 percent by weight and the alumina content from 5 to 45 percent by weight.

A typical procedure for the preparation of the baked substance will be described below by way of illustration.

The starting material for the iron oxide component may be either iron hydroxide (inclusive of limonite) or iron oxide. This raw material is suspended in an aqueous solution of aluminum nitrate and then neutralized with aqua ammonia or an aqueous solution of an alkali so that aluminum hydroxide will deposit on the surface of iron hydroxide or iron oxide and consequently precipitate. Alternatively, an iron salt such as iron nitrate or iron sulfate and the aqueous solution of aluminum nitrate or aluminum sulfate may be mixed and the resultant mixture in water may be precipitated by addition thereto of aqua ammonia or an aqueous solution of an alkali. Where an aluminate having an alkali metal moiety is used as the aluminum-containing substance, an iron oxide source may be suspended in an aqueous solution of the aluminate and thereafter carbon dioxide gas may be blown into the aqueous solution so as to cause precipitation of the hydrate of alumina. Otherwise, a similar precipitate may be obtained by mixing iron hydroxide or iron oxide with alumina sol dispersed in water or with alumina gel suspended in water and allowing the resultant mixture to stand. It is also possible to dissolve an iron salt such as iron nitrate or iron sulfate in water, mix the resultant aqueous solution with alumina sol or alumina gel held in water, and add to the resulting mixture either aqua ammonia or an aqueous solution of an alkali to produce iron hydroxide and separate the final mixture as the precipitate. The precipitate thus obtained is washed with water, dehydrated, dried and molded to a proper shape and baked at temperatures of from 300° to 1000° C.

The range of temperatures in which the exhaust gas containing $NO_x$ is reduced with ammonia by using as the catalyst the baked substance obtained as described above is from 250° to 500° C, preferably from 300° to 450° C. The amount of ammonia to be used in this reduction suffices roughly in the range of from 0.6 to 1.5, preferably from 0.9 to 1.3 by molar ratio based on the total amount of $NO_x$ present in the exhaust gas. If the amount of ammonia is less than the lower limit 0.6 by molar ratio, then the reduction of $NO_x$ will be insufficient. If the amount exceeds the upper limit 1.5 by molar ratio, then part of the ammonia used will remain in its unaltered form in the treated gas. Due attention should be paid, therefore, to preventing the amount of ammonia from exceeding 1.5 by molar ratio. It should be noted that when the exhaust gas is treated with ammonia by using as the catalyst the baked substance of this invention, the denitrification can be obtained at high percentages as indicated in the preferred embodiments without regard to the presence or absence of $SO_x$ in the exhaust gas.

The function of the alumina present in the baked substance is assumed to reside in preventing the iron oxide from sintering at the time $NO_x$ and the ammonia react with each other, imparting to the baked substance an ability to resist $SO_x$ and further increasing the activity of the iron oxide in the baked substance to a notable extent. Thus, the addition of the alumina source is for the purpose of imparting to the finally produced catalyst an ability to resist $SO_x$ and also preventing the catalyst from sintering. If the amount of the alumina source is less than 5 percent by weight computed as $Al_2O_3$, then the effects enumerated above are not manifested. If the amount exceeds 45 percent by weight, however, the catalytic activity is degraded. Accordingly, the amount of alumina source is preferred to be in the aforementioned range.

As described above, the present invention has made it possible to provide a catalyst by using as the raw material those substances which are available at relatively low prices, which catalyst is useful in removing the $NO_x$ present in the exhaust gas, by catalytic reduction, without being affected by the composition of the exhaust gas.

The present invention will be described more specifically with reference to preferred embodiments, which are given solely for illustration and should not be considered as limitations to this invention.

The percentage of $NO_x$ reduction as referred to in the following examples and the comparison examples is defined by the following formula.

$$\left(1 - \frac{NO_x \text{ concentration after contact with packed bed of catalyst}}{NO_x \text{ concentration before contact with packed bed of catalyst}}\right) \times 100 \%$$

EXAMPLE 1

An aqueous solution was obtained by dissolving 1141 g of $Fe_2(SO_4)_3 \cdot xH_2O$ and 221 g of $Al(NO_3)_3 \cdot 9H_2O$ in 4 liters of water. This aqueous solution was heated to 80° C and $NH_4OH$ adjusted in advance to 3N was added thereto until the pH of the aqueous solution reached a value of 8, so as to cause precipitation. The precipitate was aged for three hours, then separated by filtration, washed with water, dehydrated, then dried at 100° C, and pulverized to a particle size of not more than 125 $\mu$, mixed with added water, kneaded, granulated and again dried and thereafter, molded in the shape of tablets 3.5 mm in diameter and 3.5 mm in height. The tablets were baked at 550° C for one hour to produce a catalyst. A 25 ml (12.2 g) portion of the catalyst was placed in a reaction tube made of stainless steel and measuring 30 mm in inner diameter and subjected to an activity test at a space velocity of 5000 hr$^{-1}$. The gas used in this test had a composition of 3.5 percent by volume of $O_2$, 15 percent by volume of $CO_2$, 350 ppm of NO, 500 ppm of $NH_3$ (these were based on dry gas), 15 percent by volume of $H_2O$ (based on wet gas) and the balance of $N_2$. In the case of the gas containing $SO_x$, the content of $SO_x$ was 300 ppm. The results of the test were as shown in Table 1. The catalyst involved in this example had a composition of 90 percent by weight of $Fe_2O_3$ and 10 percent by weight of $Al_2O_3$.

Table 1

| $SO_x$ concentration | $NO_x$ reduction (%) | | | | |
|---|---|---|---|---|---|
| | 250° C | 300° C | 350° C | 400° C | 450° C |
| 0 | 73 | 98 | 99 | 99 | 99 |
| 300 ppm | 72 | 98 | 99 | 100 | 97 |

COMPARISON EXAMPLE 1

An aqueous solution was obtained by dissolving 1141 g of $Fe_2(SO_4)_3 \cdot xH_2O$ in 4 liters of water. This aqueous solution was heated to 80° C and $NH_4OH$ adjusted in advance to 3N was added thereto until the pH of the aqueous solution reached a value of 8, so as to cause precipitation. The precipitate was aged for three hours, separated by filtration and washed with water. The washed precipitate was dried, then pulverized to a particle size of not more than 125 $\mu$, kneaded with added water, granulated, dried and molded into tablets 3.5 mm in diameter and 3.5 mm in height. The tablets were baked at 550° C for one hour to afford a catalyst, which was then tested. A 25 ml (13.4 g) portion of the catalyst was tested for activity under the same conditions as those of Example 1. The results of the test were as shown in Table 2. It is seen from the comparison of the data of Table 1 and Table 2 that the catalyst produced by the method of this invention exhibited a notably improved activity.

Table 2

| $SO_x$ concentration | $NO_x$ reduction (%) | | | | |
|---|---|---|---|---|---|
| | 250° C | 300° C | 350° C | 400° C | 450° C |
| 0 | 14 | 56 | 68 | 78 | 54 |
| 300 ppm | 26 | 61 | 72 | 80 | 49 |

EXAMPLE 2:

An aqueous solution was obtained by dissolving 1300 g of $Al(NO_3)_3 \cdot 9H_2O$ in 3 liters of water. In the aqueous solution, 551 g of iron hydroxide was suspended. This aqueous suspension was heated to 80° C and $NH_4OH$ adjusted in advance to 3N was added thereto until the pH of the solution reached 8, so as to cause precipitation. The precipitate was aged for three hours, then washed with water, dehydrated and separated by filtration. Thereafter, the filtrate was dried at 100° C, then pulverized to a particle size of not more than 125 $\mu$, kneaded with added water, granulated, dried and molded in the shape of tablets 3.5 mm in diameter and 3.5 mm in height. The molded catalyst was baked at 650° C for one hour and thereafter subjected to an activity test under the same conditions as those of Example 1. The results were as shown in Table 3. The catalyst had a composition of 70 percent by weight of $Fe_2O_3$ and 30 percent by weight of $Al_2O_3$.

Table 3

| $SO_x$ concentration | $NO_x$ reduction (%) | | | | |
|---|---|---|---|---|---|
| | 250° C | 300° C | 350° C | 400° C | 450° C |
| 0 | 45 | 93 | 99 | 99 | 99 |
| 300 ppm | 46 | 95 | 99 | 99 | 99 |

EXAMPLE 3

An aqueous solution was prepared by dissolving 3500 g of alumina sol containing 5 percent by weight of $Al_2O_3$ in 4 liters of water. In the aqueous solution, 325 g of finely pulverized $Fe_2O_3$ was placed and agitated to produce a precipitate, which was separated by filtration. The precipitate was dried, then pulverized to a particle size of not more than 125 $\mu$, kneaded with added water, granulated and molded in the shape of tablets 3.5 mm in diameter and 3.5 mm in height. The molded precipitate was baked at 550° C for one hour and then tested. This catalyst had a composition of 65 percent by weight of $Fe_2O_3$ and 35 percent by weight of $Al_2O_3$. The activity test was carried out under the same conditions as those of Example 1. The results were as shown in Table 4.

Table 4

| $SO_x$ concentration | $NO_x$ reduction (%) | | | | |
|---|---|---|---|---|---|
| | 250° C | 300° C | 350° C | 400° C | 450° C |
| 0 | 43 | 92 | 97 | 98 | 95 |
| 300 ppm | 45 | 93 | 96 | 98 | 96 |

COMPARISON EXAMPLE 2

To 4 liters of water, 350 g of a commercially available activated alumina wet pulverized in advance to a particle size of 1 to 2 $\mu$ and 650 g of the same $Fe_2O_3$ as used in Example 3 were added and agitated to cause precipitation. The precipitate was separated by filtration and dried. Then the dried precipitate was pulverized to a particle size of not more than 125 $\mu$, kneaded with added water, granulated then dried and molded in the shape of tablets 3.5 mm in diameter and 3.5 mm in height. The molded precipitate was baked at 550° C for 1 hour and then tested. The catalyst had a composition of 65 percent by weight of $Fe_2O_3$ and 35 percent by weight of $Al_2O_3$. The activity test was carried out under the same conditions as those of Example 1. The results of the test were as shown in Table 5.

Table 5

| $SO_x$ concentration | $NO_x$ reduction (%) | | | | |
|---|---|---|---|---|---|
| | 250° C | 300° C | 350° C | 400° C | 450° C |
| 0 | 50 | 65 | 95 | 71 | 41 |
| 300 ppm | 70 | 75 | 85 | 96 | 75 |

It is clear from Table 5 that the catalyst exhibited high activity in a certain temperature range, which was small in width. The results serve to indicate the results of Example 3 to be outstanding.

EXAMPLE 4

In 2.4 liters of an aqueous solution of sodium aluminate (4.0 percent by weight of salt content, 1.4 of molar ratio of $Na_2O/Al_2O_3$), 613 g of ferric hydroxide (Fe(OH)$_3$), was suspended. The suspended solution was held at 80° C with stirring and carbon dioxide was bubbled thereinto at a flowrate of 5.0 liters/minute for five hours. The precipitate which was consequently formed was aged at room temperature for three hours, then separated by filtration, washed repeatedly with water and thereafter dried at 100° C. The dried precipitate was pulverized to a particle size of not more than 125 μ, kneaded with added water and granulated. The granules were dried and molded in the shape of tablets 3.5 mm in diameter and 3.5 mm in height. The molded precipitate was baked at 550° C for one hour. The catalyst thus obtained was subjected to an activity test under the same conditions as those of Example 1. The results of the test were as shown in Table 6.

Table 6

| $SO_x$ concentration | $NO_x$ reduction (%) | | | | |
|---|---|---|---|---|---|
| | 250° C | 300° C | 350° C | 400° C | 450° C |
| 0 | 53 | 91 | 98 | 99 | 98 |
| 300 ppm | 60 | 93 | 99 | 99 | 98 |

The results of Table 6 indicate an excellent denitrification effect similar to those of the preceding preferred embodiments.

EXAMPLE 5

The catalysts of Examples 1, 2 and 3 were employed as representatives of those catalysts of the preceding preferred embodiments. These catalysts and the catalysts of Comparison Examples 1 and 2 were respectively subjected to a long-term continuous denitrification test with reference to an exhaust gas having a high $SO_x$ content. The results were as graphically indicated in the attached drawing. The reaction in the test was carried out under the same conditions as those of Example 1, except the space velocity of the exhaust gas was kept at 10,000/hour, the $SO_x$ content of the exhaust gas was fixed at 600 ppm and the reaction temperature was held at 400° C. In the diagram, the vertical axis is graduated for the ratio of $NO_x$ reduction (%) and the horizontal axis for the length of time (hour). In the diagram, 1 denotes the data obtained of the catalyst of Example 1, 2 those of the catalyst of Example 2, 3 those of the catalyst of Example 3, 4 those of the catalyst of Comparison Example 1 and 5 those of Comparison Example 2, respectively.

As is plain from this diagram, the catalysts of the preferred embodiments of this invention showed no discernible degradation of catalytic activity over a prolonged period of use, indicating their excellence as catalysts.

By contrast, the catalysts of Comparison Examples 1 and 2 showed gradual degradation of denitrification ratio with the elapse of time. The results obtained of the other preferred embodiments were as shown in Table 7 below. The activity test with reference to the Examples shown in Table 7 was carried out under the same conditions as those of Example 1. The catalysts were prepared by following the procedure dealt with in Examples 1, 2 and 3, with necessary modifications, except the molded precipitates were baked at 650° C for 1 hour.

It is clearly seen from Table 7 that the catalysts of these preferred embodiments also showed high denitrification ratios.

Table 7

| | Conditions for the preparation of catalyst | | | | | | | | | |
|---|---|---|---|---|---|---|---|---|---|---|
| Ex. | Iron salt | Alumina source | Neutralizing agent | $Fe_2O_3$ : $Al_2O_3$ (weight %) | $SO_x$ concentration | $NO_x$ reduction (%) | | | | |
| | | | | | | 250° C | 300° C | 350° C | 400° C | 450° C |
| 6 | $FeSO_4 \cdot 7H_2O$ | $Al(NO_3)_3 \cdot 9H_2O$ | $NH_4OH$ | 80:20 | 0 | 68 | 98 | 99 | 99 | 97 |
| | | | | | 300 ppm | 65 | 97 | 99 | 99 | 99 |
| 7 | $FeSO_4:Fe(SO_4)_3$ (1:2) molar ratio | $Al_2(SO_4)_3 \cdot nH_2O$ | NaOH | 90:10 | 0 | 41 | 98 | 98 | 99 | 90 |
| | | | | | 300 ppm | 43 | 97 | 98 | 99 | 99 |
| 8 | $Fe(NO_3) \cdot 9H_2O$ | $Al_2(SO_4)_3 \cdot nH_2O$ | $NH_4OH$ | 70:30 | 0 | 63 | 96 | 98 | 99 | 97 |
| | | | | | 300 ppm | 67 | 90 | 99 | 99 | 99 |
| 9 | $Fe(NO_3) \cdot 9H_2O$ | $Al(NO_3)_3 \cdot 9H_2O$ | NaOH | 95:5 | 0 | 54 | 97 | 99 | 99 | 96 |
| | | | | | 300 ppm | 51 | 98 | 99 | 98 | 98 |
| 10 | $Fe(OH)_3$ | $Al(NO_3)_3 \cdot 9H_2O$ | $NH_4OH$ | 90:10 | 0 | 48 | 95 | 97 | 98 | 96 |
| | | | | | 300 ppm | 44 | 94 | 98 | 99 | 99 |
| 11 | Limonite (finely pulverized) | $Al(NO_3)_3 \cdot 9H_2O$ | $NH_4OH$ | 70:30 | 0 | 55 | 96 | 99 | 99 | 89 |
| | | | | | 300 ppm | 58 | 97 | 99 | 98 | 95 |

What is claimed is:

1. A method for the production of a catalyst for use in the reduction of nitrogen oxides, which method comprises:
    (a) suspending at least one iron-containing substance selected from the group consisting of $Fe_2O_3$, $Fe_2O_3 \cdot nH_2O$, $Fe(OH)_2$, $Fe(OH)_3$ and $Fe_3O_4 \cdot nH_2O$ in an aqueous solution consisting essentially of water and at least one aluminum-containing substance selected from the group consisting of alumina sol, alumina gel and water-soluble aluminum salts whereby said aluminum-containing substance deposits on the surface of said iron-containing substance as a precipitate, the ratio of the suspended iron-containing substance to the aluminum-containing substance being 55 to 95 weight percent as $Fe_2O_3$ to 5 to 45 weight percent as $Al_2O_3$; and
    (b) washing and drying the resultant precipitate;
    (c) molding the dried precipitate;
    (d) baking the molded precipitate at a temperature in the range of from 300° to 1000° C to obtain a product consisting essentially of iron oxide and alumina.

2. The method according to claim 1, wherein said water-soluble aluminum salt is aluminum nitrate, aluminum sulfate, aluminum formate or aluminate having alkali metal moiety.

3. The method of claim 1, wherein aqua ammonia or an aqueous solution of an alkali is added to the mixture in water to neutralize said mixture thereby forming said precipitate.

* * * * *